Patented Feb. 10, 1942

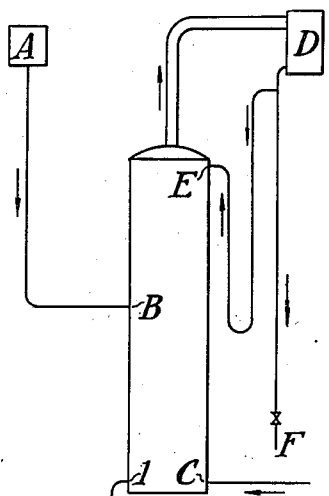
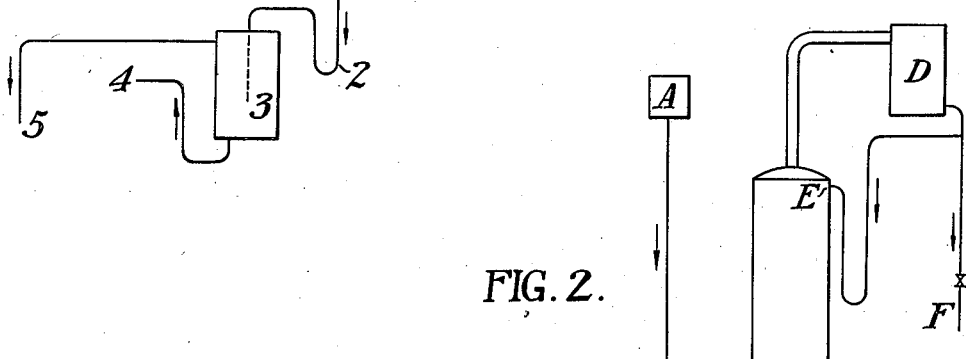
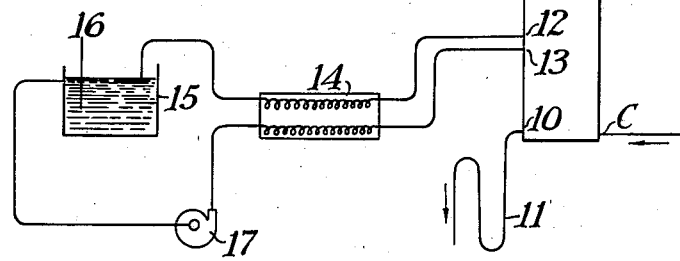

2,272,193

UNITED STATES PATENT OFFICE 2,272,193

METHOD OF RECLAIMING PLASTICIZERS

Webster E. Fisher and Albert G. Bright, Rochester, N. Y., assignors to Eastman Kodak Company, Rochester, N. Y., a corporation of New Jersey Application December 1, 1937, Serial No. 177,550

11 Claims. (Cl. 260—461)

This invention relates to the recovering of plasticizers from the solvents used in leaching film scrap by introducing the solution of crude plasticizer in the solvent into a distilling column whereby, in the presence of water, the solvent is concentrated and removed at the top of the column and a mixture of the plasticizer and water is removed at the base.

In the leaching of scrap photographic film there results a solution of the plasticizer in an organic solvent. One method of recovering the plasticizer, when the solvent is water-soluble, is to dilute the solvent with water until the plasticizer precipitates out. The plasticizer is then separated from the liquid, for example by filtering or centrifuging and the liquid is then subjected to distillation to recover it. This method involves the handling of large amounts of water to satisfactorily recover the plasticizer and also the necessity of filtering to separate the plasticizer from the liquid.

We have found that the plasticizer can be recovered from the leaching solvent in a very simple and inexpensive manner. We have found that, if the solvent containing the plasticizer is fed to a continuous distilling column and heat is applied thereto, such as by steam, the solvent is concentrated and may be removed at the top of the column while the plasticizer, together with water, accumulates at the base of the column and is removed therefrom with the water. The plasticizer is then separated from the water, for instance by a gravity separation. The plasticizer may then be recovered from the crude plasticizer in pure condition, by the process described and claimed in Reid Patent No. 2,217,706, dated October 15, 1940.

The drawing illustrates apparatus which may be employed to carry out our invention. The solvent containing plasticizer and water is fed from tank A to the distilling column at point B. Low pressure steam is introduced into the base of the column at inlet C. The solvent vapor from the top of the column passes to condenser D, where it is liquefied, part of the condensate being returned as reflux to the top of the column at E and part being withdrawn as refined solvent at F.

Referring to Fig. I, the mixture of water and plasticizer which has collected at the base of the column is withdrawn at point 1 through the trap 2 and introduced into the continuous gravity separator 3 where the plasticizer and water separate into layers. The plasticizer is saved for further refining treatment. The water is either run to waste or further treated to recover the minute amount of plasticizer which may still be present therein.

Fig. II is like Fig. I except as to the means provided for the withdrawal of the water and plasticizer. The apparatus diagrammed in Fig. II is adapted to the recovery of plasticizers, such as camphor, characterized by having a melting point above the boiling point of water, slight solubility in water and volatility with steam.

In Fig. II, at least a part of the downflow containing water and plasticizer is removed at 12, near the base of the column, sufficiently low so that not more than a small concentration of solvent is present and is cooled by some means such as by being passed through the heat interchanger 14, or by adding water or both. This liquid is then introduced into settling tank 15 provided with the baffle 16. The camphor is skimmed off and is then ready to be refined as desired. The water containing approximately 0.1% dissolved camphor is removed from the settling tank at the side protected by the baffle and is pumped back by pump 17 through the heat interchanger 14 into the column at point 13, just below the point 12 where the camphor and water were removed. By returning this water containing a minute amount of dissolved camphor, the camphor is steamed out therefrom and its loss is thus avoided.

The water, free from camphor, is removed from the base of the column at 10 through the trap 11.

Referring to Fig. I, the following example illustrates the removal of a plasticizer, having a melting point below the boiling point of water, from the solvent in which it is present after having been leached out of film scrap:

A solvent which has been employed to leach film scrap and which consists, after the leaching, of approximately 75% methyl alcohol, 24% water and 1% triphenyl phosphate was continuously fed from tank A into a distilling column containing 30 plates at point B which is 16 or 17 plates from the base of the column.

For optimum efficiency, it is preferred to introduce the solvent at or near the point in the column where the corresponding water-solvent ratio is located. If this is not done it is necessary to adjust the reflux ratio by supplying more heat and by diverting a greater portion of the distillate for reflux.

The minimum length of the column (referred to by the number of plates) which is desirable depends on the boiling point of the solvent and its dilution. As the boiling point of the solvent nears that of water or as the solvent becomes more aqueous, it is desirable to increase the length of the column for best results.

Low pressure steam is introduced into the base of the column while the crude solvent is being fed in at point B. The solvent vapors are continuously formed and pass continuously into the condenser D where they are liquefied. Part of the highly concentrated methyl alcohol condensate is drawn off and the remainder is used as a refluxing liquid, being allowed to pass continuously into the column at or near the top so as to provide reflux for the column. The ratio of the portion used for refluxing to that withdrawn is called the "reflux ratio." This ratio should be governed by the conditions of operation and the degree of concentration of methyl alcohol desired. For instance, for a reflux ratio of 1 it is necessary that enough steam be introduced into the column so that half of the condensate must be returned to the column. With the use of less steam, not as much of the condensate should be returned for best results. If the crude solvent introduced into the column is very aqueous, it is desirable to increase the "reflux ratio" as otherwise the condensate will be somewhat aqueous compared with the concentration of methyl alcohol (or other solvent) obtainable under proper conditions.

The triphenyl phosphate and water collect at the base of the column and are withdrawn and passed to a separator where they separate into two layers, usually liquid, and are drawn off separately. Even though triphenyl phosphate is a solid under ordinary conditions, its temperature is sufficiently high when it comes from the column that it will remain liquid until separated from the water. It may, however, be necessary to warm the decanter such as with steam or hot water if the plasticizer is to be kept liquid.

The water may contain a finely divided colloidal suspension of the plasticizer. For instance, in the example, the water contains .2–.3% of triphenyl phosphate in colloidal form. We have found that, if a strong electrolyte is added to this suspension, the suspended triphenyl phosphate will separate from the water and may be recovered therefrom by means of a separator. It is convenient to add the electrolyte at or near the base of the column, so that practically complete separation of the triphenyl phosphate from the water has occurred by the time it reaches the outlet from the continuous separator. It may also be desirable to add the electrolyte before the crude feed is introduced into the column. For example, to 67 parts by volume of a triphenyl phosphate suspension is added one part by volume of a 40–50% water solution of calcium chloride. In the space of about 10 seconds the triphenyl phosphate settles to the bottom and the water is run to waste with very small loss of plasticizer. Other electrolytes which may be used are listed in Piker and Pool Patent No. 2,124,894, issued July 26, 1938.

Instead of or auxiliary to low pressure steam, other heating means such as high pressure steam, electric heat etc., may be employed in carrying out our process.

If desired, two solutions comprising the same solvent but having different concentrations may be fed into the column at the same time. It is desirable that each solution be fed in at the point approximating its concentration. The solvent concentration gradient of the column under normal conditions may be considered as extending from substantially 0%, at the point where the plasticizer is removed, to substantially 100% at the top. Therefore, as the concentration of the solvent to be introduced into the column increases, the point of introduction should be nearer the top of the column.

Figure II illustrates the arrangement which is desirable for recovering a plasticizer having a melting point above the boiling point of water, where the plasticizer is slightly soluble in water and is volatile with steam. If the recovery of a plasticizer having a high melting point but substantially no vapor pressure and no solubility in water, is contemplated, there would obviously be no necessity of returning the water to the column.

The plasticizers which may be recovered by our process are preferably those which are stable to and insoluble in hot water, although lacking these qualities the process might still be applicable, since the only result would be some loss of yield through solubility or hydrolysis. The following plasticizers are examples of compounds which may be recovered from the solvent in which they are dissolved, in accordance with our process:

Benzophenone
Camphor
Dimethyl phthalate
Diethyl phthalate
Dipropyl phthalate
Dibutyl phthalate
Diethoxyethyl phthalate
Dibutyl tartrate
Butyl stearate
Tributyl phosphate
Tricresyl phosphate
Triphenyl phosphate
Tripropionin
Tributyrin
Diethyl sebacate
Methyl phthalyl ethyl glycollate
Ethyl phthalyl ethyl glycollate
Butyl phthalyl butyl glycollate
o-Cresyl p-toluene sultonate
Cyclohexyl p-toluene sulfonamide The solvents which are susceptible of treatment by processes in accordance with our invention are those which are more volatile than water, either by reason of lower boiling point or the formation of a constant boiling mixture. Butyl alcohol is an example of the latter class in that it forms a heterogeneous constant boiling mixture at 90° C. Some of these solvents may be used in aqueous condition in leaching film scrap, while others, such as methyl alcohol on cellulose acetate or ethyl alcohol on cellulose nitrate, may only be diluted by the moisture present on the film scrap which is treated. The following solvents are examples of those susceptible of treatment by our invention:

Methyl alcohol
Ethyl alcohol
n-Propyl alcohol
i-Propyl alcohol
n-Butyl alcohol
i-Butyl alcohol
sec-Butyl alcohol
Acetone
Methyl ethyl ketone
Diethyl ketone Mixtures of any of these liquids which are compatible will also, as a rule, be susceptible to the separation of plasticizer and water therefrom. For instance, mixtures of acetone and a lower aliphatic alcohol such as acetone-methyl alcohol, acetone-ethyl alcohol or acetone-isopropyl alcohol may be suitable for use as leaching solvents in various film scrap recovery processes. All of these are susceptible of treatment in accordance with our invention.

The solvent which is employed depends upon the particular plasticizer which is to be recovered. For instance, triphenyl phosphate is soluble in all of the solvents listed above and, therefore, any one of them could be employed for the leaching solvent where that plasticizer is to be recovered.

Although most of the solvents which are employed for leaching film scrap are water-miscible, nevertheless, water-immiscible solvents such as carbon tetrachloride, ethylene chloride, benzene, toluene, methyl acetate or water-immiscible solvent mixtures may be employed in leaching the plasticizer from film scrap. Our process is also adapted to recovering the plasticizer therefrom by running the mixture of solvent and water into the column at the point corresponding to the percentage of each present. Our process is more practical for the recovery of plasticizers from solvents which are miscible with water and it is to this that our invention is more particularly directed.

In the withdrawal of water and plasticizer it is preferable that the withdrawal be continuous. This withdrawal may be controlled by means of a trap, a liquid level controller or any other suitable means. If a still pot or some other receptacle is present at the bottom of the column, or if some other means is present to permit the accumulation of water and plasticizer, the withdrawal may be at intervals if desired.

Centrifugal separation might be desirable in some cases to remove the water from the plasticizer. For instance, if the specific gravity of the plasticizer is fairly close to that of water, or if the plasticizer emulsifies with water, it might be difficult in some cases to separate the plasticizer and water by gravity, whereas a centrifugal separation might be accomplished more easily.

We have found that, in the operation of our process with plasticizers having a relatively low melting point, such as triphenyl phosphate, it is preferable to keep the water-plasticizer mixture drawn from the column sufficiently warm to maintain the plasticizer in liquid condition. The water and plasticizer separate into layers and each layer may be drawn off. If desired, the mixture may be permitted to cool to at least the solidifying point of the plasticizer and the solid plasticizer can then be allowed to settle out and the water drawn off therefrom. After the water has been removed, the plasticizer can either be removed in solid form or melted and drawn off.

After the plasticizer has been recovered by our process it may be desirable to subject it to a refining treatment, if it is desired to obtain it in a form approaching chemical purity. The purpose of our invention is to remove all of the leaching solvent from the plasticizer and to recover that solvent. If there are still objectionable impurities present in the plasticizer after it has been recovered by our process, some refining treatment should be applied thereto.

The electrolyte which is added to the water to aid in removing the plasticizer therefrom may be added at almost any point. It may be already present, from its addition in an earlier step in the recovering of the cellulose esters, such as from the process described and claimed by Piker and Pool in their Patent No. 2,124,894, issued July 26, 1938. If the amount of electrolyte present is not deemed to be sufficient, it may be increased by a further addition.

If electrolyte is not inherently present, such as from the Piker and Pool process it may be added to the aqueous solvent before it enters the column, to the liquid while in the column, or to the mixture of plasticizer and water after removal from the column.

We claim:

1. In the process of recovering camphor from the water-miscible solvent in which it is dissolved by treating it in a distilling column with steam and recovering the camphor from the water therein, the step which comprises returning the water containing residual camphor to the distilling column whereby the residual camphor is removed therefrom.

2. The process of recovering camphor from scrap cellulose nitrate photographic film, which comprises leaching the wet scrap with ethyl alcohol, continuously introducing the spent alcohol into a distilling column within the middle portion thereof, introducing steam at the bottom of the column, collecting and condensing the vapors and returning part of the condensate to the column as refluxed liquid, withdrawing the mixture of camphor and water which collects near the bottom of the column and allowing the camphor and water to separate into layers whereby the camphor can be recovered.

3. The process of recovering plasticizer from scrap photographic film, which comprises leaching the scrap with a mixture of acetone and a lower aliphatic alcohol which will dissolve the plasticizer but not the base of the film the acetone-alcohol having a boiling point below that of which either the plasticizer or an azeotrope of plasticizer and water will distill off, continuously introducing the spent solvent containing plasticizer and water into a distilling column at approximately the point at which the solvent concentration gradient of the column corresponds to the concentration of the spent solvent, applying heat thereto, refluxing, withdrawing the mixture of plasticizer and water present at the base of the column and separating the plasticizer from the water.

4. The process of recovering plasticizer from scrap photographic film, which comprises leaching the scrap with a mixture of acetone and methyl alcohol which will dissolve the plasticizer but not the base of the film the acetone-alcohol having a boiling point below that of which either the plasticizer or an azeotrope of plasticizer and water will distill off, continuously introducing the spent solvent containing plasticizer and water into a distilling column at approximately the point at which the solvent concentration gradient of the column corresponds to the concentration of the spent solvent, applying heat thereto, refluxing, withdrawing the mixture of plasticizer and water present at the base of the column and separating the plasticizer from the water.

5. The process of recovering triphenyl phosphate from scrap photographic film, which comprises leaching the scrap with a mixture of acetone and methyl alcohol which will dissolve the triphenyl phosphate but not the base of the film the acetone-alcohol having a boiling point below that at which either the triphenyl phosphate or an azeotrope of triphenyl phosphate and water will distill off, continuously introducing the spent solvent containing plasticizer and water into a distilling column at approximately the point at which the solvent concentration gradient of the column corresponds to the concentration of the spent solvent, applying heat thereto, refluxing, withdrawing the mixture of triphenyl phosphate and water present at the base of the column and separating the triphenyl phosphate from the water.

6. The process of recovering high boiling plasticizer from film scrap which comprises leaching the film scrap with an alcohol more volatile than water in which the major portion of the film base is insoluble but in which the plasticizer is soluble, continuously introducing the spent leaching liquid containing plasticizer and water into a distilling column, applying heat thereto, refluxing, withdrawing the mixture of plasticizer and water which collects at the bottom of the column and separating the plasticizer from the water.

7. The process of recovering a triaryl phosphate from a water-miscible solvent in which it is dissolved, which solvent is more volatile than water, which comprises continuously introducing the solvent containing plasticizer and water into a distilling column at approximately the point of solvent concentration gradient corresponding thereto, introducing steam at the bottom of the column, collecting and condensing the vapors and returning part of the condensate to the column as refluxing liquid, withdrawing the mixture of plasticizer and water which collects at the bottom of the column and allowing the triaryl phosphate and water to separate into layers while it is at a sufficient temperature for the triaryl phosphate to be liquid and then recovering the triaryl phosphate from the water.

8. The process of recovering a high boiling plasticizer from photographic film scrap which comprises leaching the scrap with an alcoholic solvent for the plasticizer, which solvent is more volatile than water and which will not dissolve the principal portion of the film base, continuously introducing the solvent containing plasticizer and water into a distilling column, applying heat thereto, refluxing, withdrawing the mixture of plasticizer and water which collects at the bottom of the column, separating the plasticizer from the water and then recovering the plasticizer therefrom.

9. The process of recovering a triaryl phosphate from photographic film scrap which comprises leaching the film scrap with an alcohol which is more volatile than water and which will not dissolve the principal portion of the film base, continuously introducing the spent leaching solvent containing triaryl phosphate and water into a distilling column at approximately the point of solvent concentration gradient corresponding thereto, introducing steam at the bottom of the column, collecting and condensing the vapors and returning part of the condensate to the column as refluxing liquid, withdrawing the mixture of triaryl phosphate and water which collects at the bottom of the column and passing it into a gravity separator to separate the water therefrom.

10. The process of recovering a water-insoluble steam-volatile plasticizer from the solvent in which it is dissolved, which solvent is more volatile than water, which comprises continuously introducing the solvent containing plasticizer and water into a distilling column, applying heat thereto, refluxing, withdrawing the mixture of plasticizer and water from the bottom of the column where it forms, allowing the liquid to stand so that a major portion of the plasticizer separates from the water and then returning the water to the distilling column whereby the residual plasticizer is removed therefrom.

11. The process of recovering a high boiling plasticizer from photographic film scrap which comprises leaching the scrap with a water-miscible solvent for the plasticizer, which solvent is more volatile than water and will not dissolve the principal portion of the film base, continuously introducing the spent leaching liquid containing plasticizer and water into a distilling column, applying heat thereto, refluxing, withdrawing the mixture of plasticizer and water which collects at the bottom of the column and separating the plasticizer from the water.

WEBSTER E. FISHER.
ALBERT G. BRIGHT.